US008032178B2

(12) United States Patent
Choi et al.

(10) Patent No.: US 8,032,178 B2
(45) Date of Patent: Oct. 4, 2011

(54) MOBILE TERMINAL (75) Inventors: Kyoosung Choi, Seoul (KR); Yiseob Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 959 days.

(21) Appl. No.: 11/958,355

(22) Filed: Dec. 17, 2007

(65) Prior Publication Data

US 2008/0176605 A1 Jul. 24, 2008

(30) Foreign Application Priority Data

Jan. 18, 2007 (KR) .................. 10-2007-0005522

(51) Int. Cl.
*H04M 1/00* (2006.01)
(52) U.S. Cl. ............... 455/556.1; 455/575.4; 455/575.1
(58) Field of Classification Search .................. 455/90.3, 455/556.1–556.2, 566, 575.1, 575.3, 575.4
See application file for complete search history.

(56) References Cited

U.S. PATENT DOCUMENTS

| | | | | |
|---|---|---|---|---|
| 6,370,362 B1 * | 4/2002 | Hansen et al. | ............... | 455/90.1 |
| 6,559,881 B1 * | 5/2003 | Vooi-Kia et al. | ........... | 348/14.08 |
| 2003/0203747 A1 * | 10/2003 | Nagamine | .................. | 455/575.3 |
| 2004/0061725 A1 * | 4/2004 | Usuda et al. | .................. | 345/848 |
| 2004/0110545 A1 * | 6/2004 | Kim | ........................... | 455/575.1 |
| 2004/0171405 A1 * | 9/2004 | Amano et al. | ............. | 455/556.2 |
| 2005/0054397 A1 * | 3/2005 | Kim et al. | ................... | 455/575.4 |
| 2006/0003817 A1 * | 1/2006 | Lee et al. | ................... | 455/575.3 |
| 2008/0076491 A1 * | 3/2008 | Sugimoto | ................. | 455/575.3 |
| 2008/0119248 A1 * | 5/2008 | Nissen et al. | ............. | 455/575.4 |

* cited by examiner

*Primary Examiner* — Matthew Sams
*Assistant Examiner* — Marisol Fahnert
(74) *Attorney, Agent, or Firm* — Lee, Hong, Degerman, Kang & Waimey (57) ABSTRACT The present invention relates to a mobile terminal. The mobile terminal comprises a first body, a first key button part disposed on a front surface of the first body, a second body rotatable connected to the first body such that the second body is rotatable about a longitudinal axis of the first body, a display disposed on a front surface of the second body, a camera disposed on a rear surface of the first body, and a sliding cover slidably connected to the first body. When the sliding cover is in a closed state, the first key button part and the camera are covered by the sliding cover, and when the sliding cover is in an opened state, the first key button part and the camera are exposed.

17 Claims, 7 Drawing Sheets

MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2007-0005522, filed on Jan. 18, 2007, the contents of which are hereby incorporated by reference herein in their entirety.

FIELD OF THE INVENTION

The present invention relates to a mobile terminal, and more specifically, to a mobile terminal having a sliding cover.

BACKGROUND OF THE INVENTION

Generally, a mobile terminal includes a display and a key button part located on a front surface of the mobile terminal. Because the key button part is externally exposed on the front surface of the mobile terminal, the mobile terminal is susceptible to unintended contact of the key button part, and may therefore malfunction.

The mobile terminal also includes a camera located on a rear surface thereof, for example. Accordingly, because the camera is also externally exposed, the camera is susceptible to damage due to unintended contact.

Furthermore, the mobile terminal having the camera located on the rear surface thereof is additionally problematic because it is not conducive to supporting certain types of services. For example, a service such as a video telecommunication service cannot be provided using this type of mobile terminal because the video telecommunication service requires the camera to be located on the same surface as the display (front surface, for example) in order for a user to benefit from the service.

SUMMARY OF THE INVENTION

The present invention is directed to a mobile terminal having a sliding cover.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a mobile terminal comprising a first body, a first key button part disposed on a front surface of the first body, a second body rotatably connected to the first body such that the second body is rotatable about a longitudinal axis of the first body, a display disposed on a front surface of the second body, a camera disposed on a rear surface of the first body, and a sliding cover slidably connected to the first body, wherein when the sliding cover is in a closed state, the first key button part and the camera are covered by the sliding cover, and when the sliding cover is in an opened state, the first key button part and the camera are exposed.

In one aspect of the invention, the mobile terminal further comprises a rear key button part disposed on the rear surface of the first body, wherein the rear key button part is exposed when the sliding cover is in a closed or opened state. Preferably, the sliding cover comprises a rear surface opening for exposing the rear key button part of the first body when the sliding cover is in the closed state.

In another aspect of the invention, the mobile terminal further comprises a controller providing a video telecommunication function using the camera and display when the display is rotated toward the rear of the mobile terminal and the sliding cover is in the opened state. Preferably, the controller controls the camera according to an input from the rear key button part.

In a further aspect of the invention, the mobile terminal further comprises a controller controlling a music output according to an input from the rear key button part when the display is rotated toward the rear of the mobile terminal and the sliding cover is in the closed state. Preferably, the controller displays one or more music icons on the display when the display is rotated toward the rear of the mobile terminal and the sliding cover is in the closed state.

In a further aspect of the invention, the mobile terminal further comprises a second key button part disposed on the front surface of the first body, wherein the second key button part is exposed when the sliding cover is in a closed or opened state. Preferably, the second key button part is disposed on an upper front surface of the first body above the first key button part. Preferably, the sliding cover comprises a front surface opening for exposing the second key button part of the first body when the sliding cover is in the closed state. Preferably, the second key button part comprises a multi-function key button. Preferably, the multi-function key button is a rotation input device.

In another aspect of the invention, the mobile terminal further comprises a controller performing an image-capturing function using the camera when the sliding cover is in the opened state.

In a further aspect of the invention the mobile terminal further comprises a camera disposed on the front surface of the second body, and a controller for performing a video telecommunication function using the display and the camera disposed on the front surface of the second body.

In another aspect of the invention, the mobile terminal further comprises a rotation blocking unit for blocking rotation of the second body when the sliding cover is in the closed state. Preferably, the rotation blocking unit comprises one or more protrusions extended from an upper end of the sliding cover engaging with a lower end of the second body. Preferably, the mobile terminal further comprises a controller for activating a mode to perform a function corresponding to a rotation of the second body or when the sliding cover is in the opened state.

In accordance with another embodiment of the present invention, a mobile terminal comprises a first body, a second body rotatably connected to the first body such that the second body is rotatable about a longitudinal axis of the first body, a sliding cover slidably connected to the first body for covering and uncovering a front and rear surface of the first body, and a controller for activating a mode to perform a function corresponding to a rotation of the second body or when the sliding cover is slid to uncover the front and rear surface of the first body.

In one aspect of the invention, the mobile terminal further comprises a first key button part disposed on a front surface of the first body, a display disposed on a front surface of the second body, and a camera disposed on a rear surface of the first body, wherein when the sliding cover is slid to cover the front and rear surface of the first body, the first key button part and the camera are covered by the sliding cover, and when the sliding cover is slid to uncover the front and rear surface of the first body, the first key button part and the camera are exposed.

In accordance with another embodiment of the present invention, a mobile terminal comprises a body, a display disposed on an upper portion of a front surface of the body, a first key button part disposed on the front surface of the body under the display, a second key button part disposed on the front surface of the body between the display and the first key button part, a camera disposed on a rear surface of the body, and a sliding cover slidably connected to the body, wherein when the sliding cover is in a closed state, the first key button part and the camera are covered by the sliding cover, and when the sliding cover is in an opened state, the first key button part and the camera are exposed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to a mobile terminal having a sliding cover. Hereinafter, preferred embodiments of the present invention will be described in detail with reference to the attached drawings.

Figure 1:
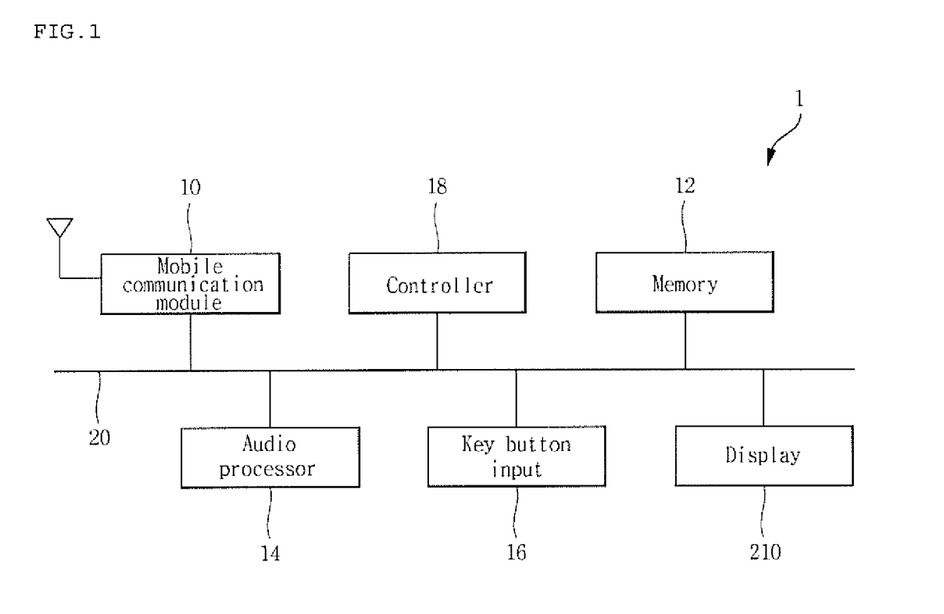
FIG. 1 is a block diagram illustrating a mobile terminal in accordance with one embodiment of the present invention.

FIG. 1 is a block diagram illustrating a mobile terminal in accordance with one embodiment of the present invention.

Figure 2:
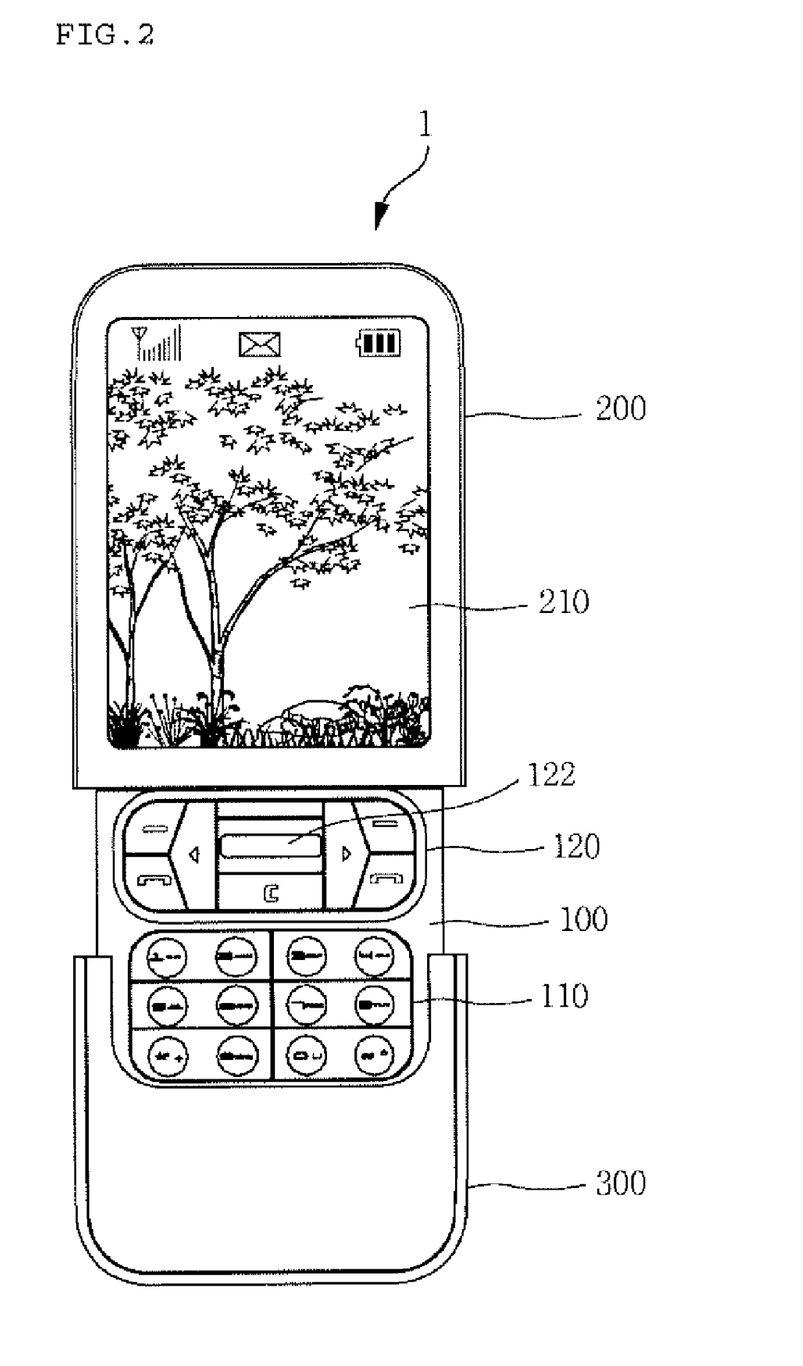
FIG. 2 is a front view of the mobile terminal in accordance with one embodiment of the present invention, wherein a sliding cover is opened.
Figure 3:
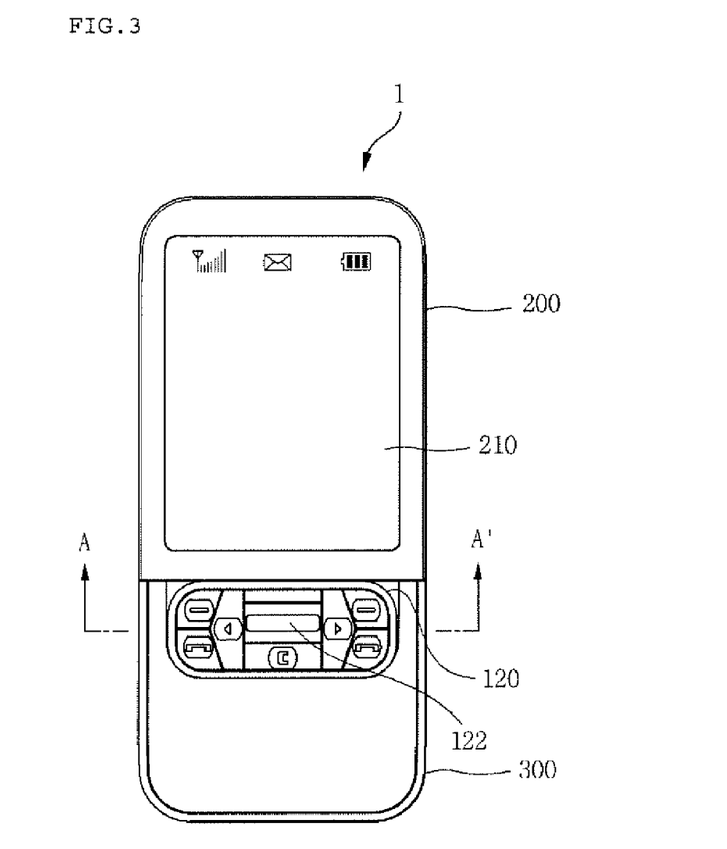
FIG. 3 is a front view of the mobile terminal in accordance with one embodiment of the present invention, wherein a sliding cover is closed.
Figure 4:
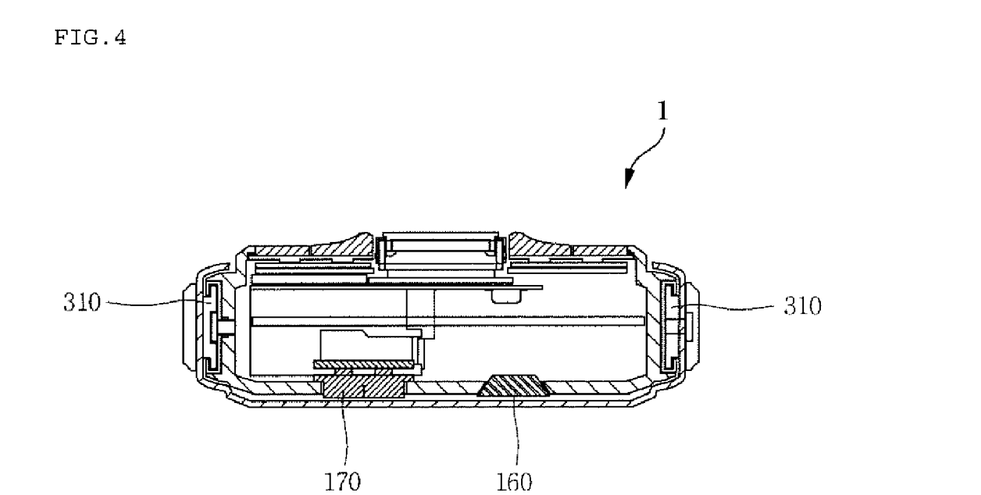
FIG. 4 is a cross-sectional view of the mobile terminal in accordance with one embodiment of the present invention cut along line AA' in FIG. 3.
Figure 5:
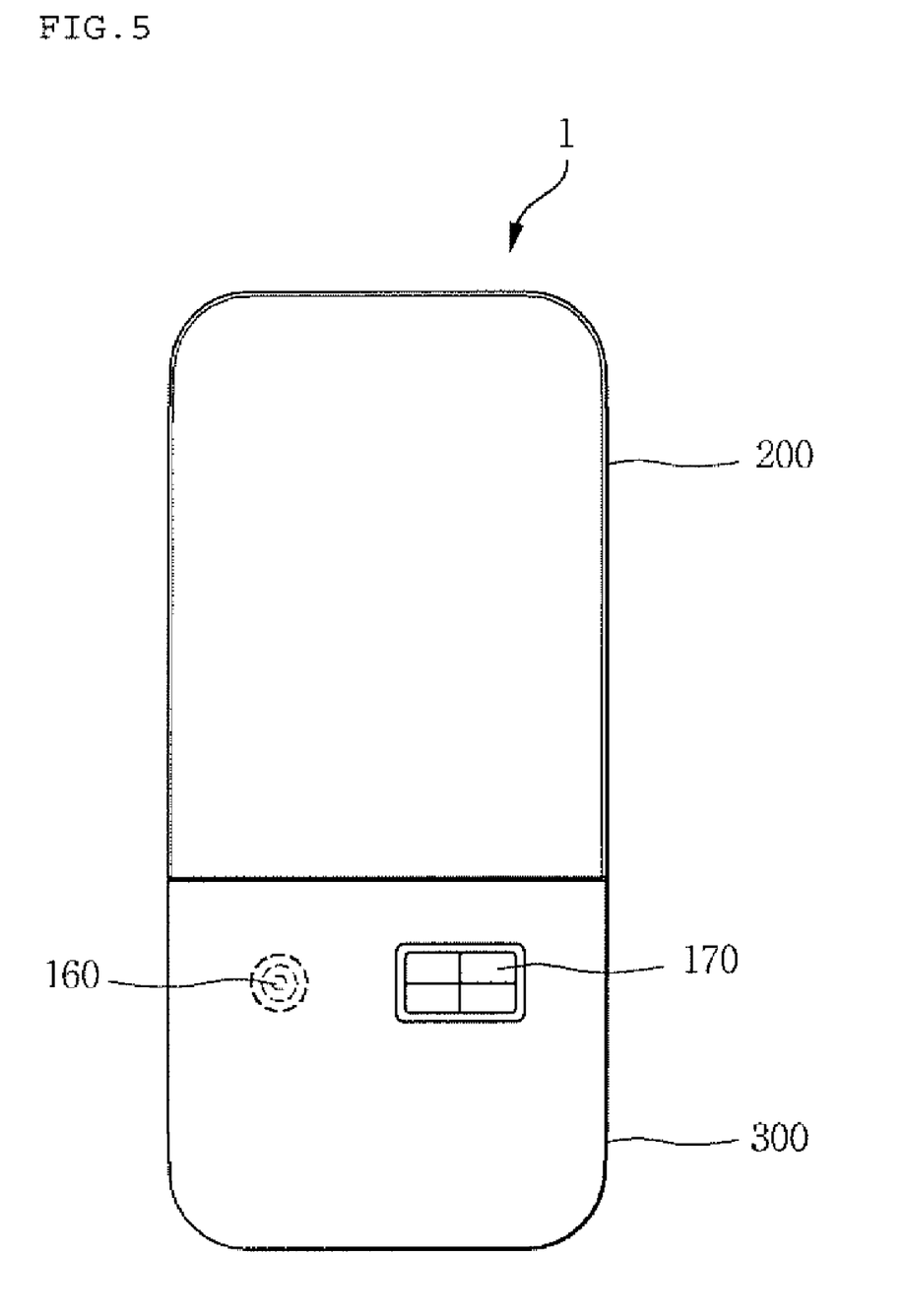
FIG. 5 is a rear view of the mobile terminal in accordance with one embodiment of the present invention, wherein a sliding cover is closed.
Figure 6:
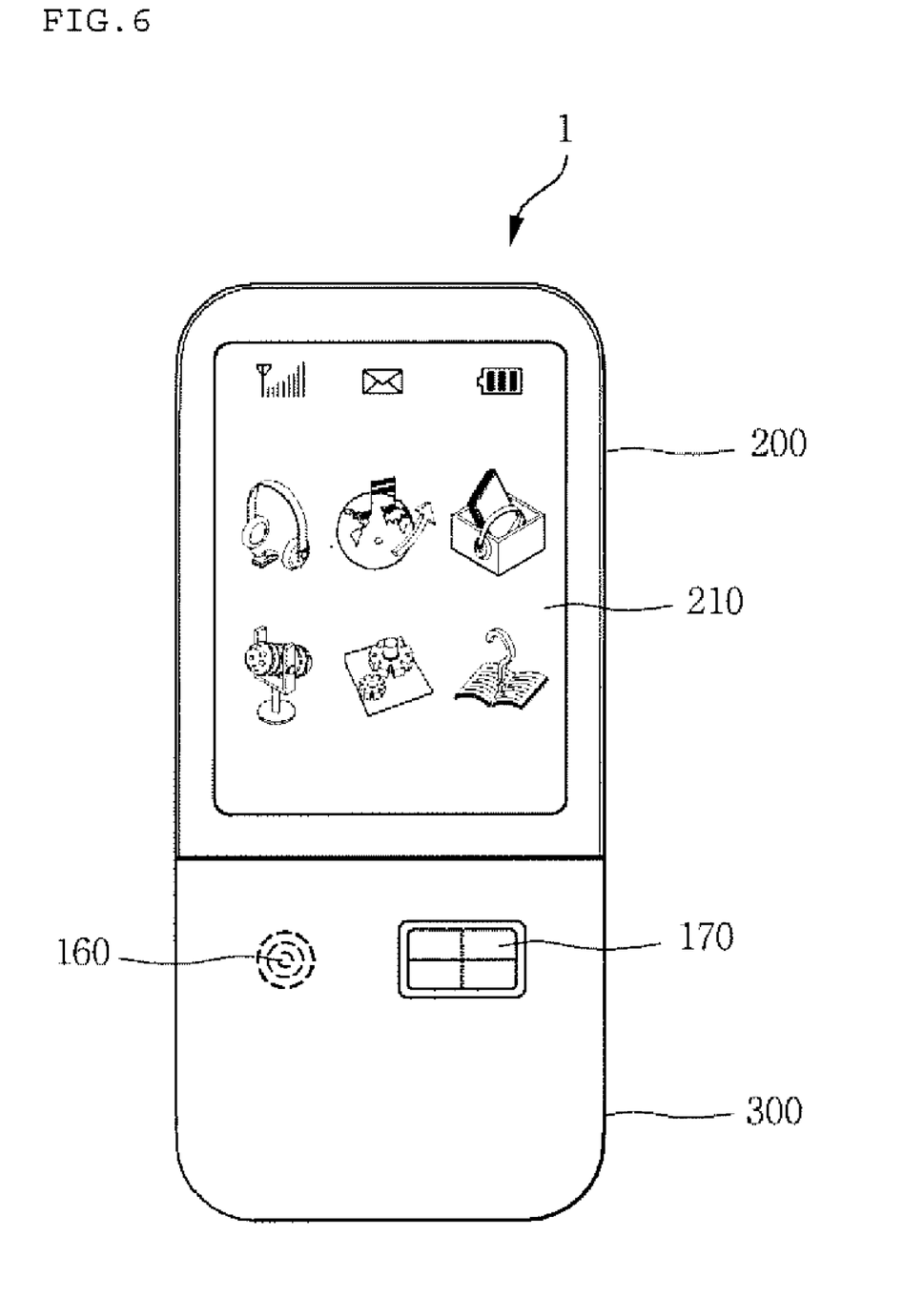
FIG. 6 is a rear view of the mobile terminal in accordance with one embodiment of the present invention, wherein a second body is rotated and a sliding cover is closed.
Figure 7:
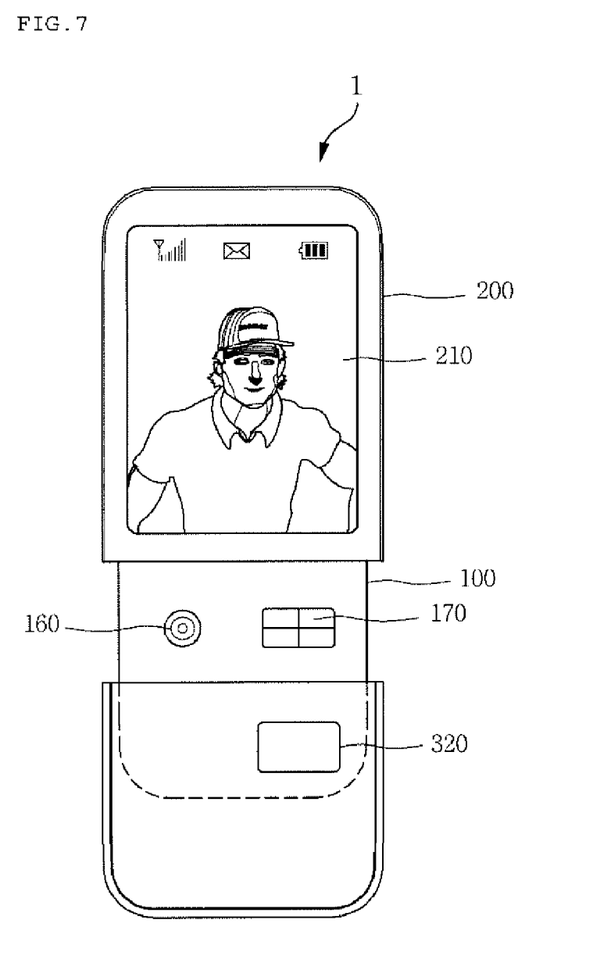
FIG. 7 is a rear view of the mobile terminal in accordance with one embodiment of the present invention, wherein a second body is rotated and a sliding cover is opened.
Figure 8:
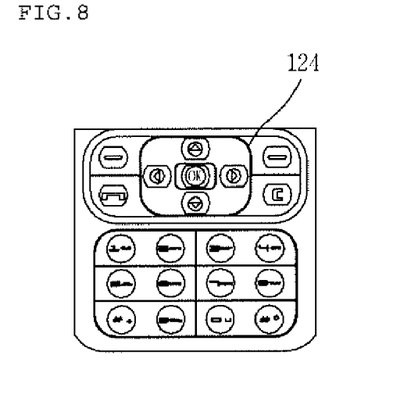
FIG. 8 is a front view illustrating a modified example of a second key button of the mobile terminal in accordance with one embodiment of the present invention.

FIG. 2 is a front view of the mobile terminal, wherein a sliding cover is opened. FIG. 3 is a front view of the mobile terminal, wherein a sliding cover is closed. FIG. 4 is a cross-sectional view of the mobile terminal cut along line AA' in FIG. 3. FIG. 5 is a rear view of the mobile terminal, wherein a sliding cover is closed. FIG. 6 is a rear view of the mobile terminal, wherein a second body is rotated and a sliding cover is closed. FIG. 7 is a rear view of the mobile terminal, wherein a second body is rotated and a sliding cover is opened. FIG. 8 is a front view illustrating a modified example of a second key button of the mobile terminal.

Referring to FIG. 1, the mobile terminal 1 in accordance with one embodiment of the present invention comprises a mobile communication module 10, a controller 18, a memory 12, an audio processor 14, a key button input 16, and a display 210. Each element described above is connected to a bus 20.

The mobile communication module 10 is a radio communication apparatus for transmitting and receiving data to and from a mobile communication network. Preferably, the memory 12 is equipped with a program for controlling general operations of the mobile terminal 1. Moreover, the memory 12 stores data input and output during operation of the mobile terminal 1 by the controller 18, wherein various types of data are processed.

The audio processor 14 processes an audio signal for inputting and outputting audio sound through a microphone (MIC) and a speaker (SPK), respectively. Preferably, the audio processor 14 processes the audio signal to output processing and control operation results of the mobile terminal through the speaker (SPK), or input information or instructions through the microphone (MIC).

The key button input 16 is a device for receiving various types of information or instructions from the user. The key input 16 includes a first key button part 110, a second key button part 120 and a rear key button part 170, as shown in FIGS. 2 and 4-7.

The display 210 is a display device for displaying a state or various information of the mobile terminal. Preferably, information is displayed according to a control signal output from the controller 18. The controller 18 controls the elements described above as well as general operations of the mobile terminal 1 in accordance with one embodiment of the present invention.

Referring to FIG. 2, a preferred embodiment of the present invention includes a first body 100 and a second body 200. Referring to FIG. 2, the second body 200 includes a display 210 on a front surface thereof. Preferably, the second body 200 is connected to an upper end of the first body 100 by a swivel hinge so as to be rotated about a longitudinal axis of the first body 100.

Still referring to FIG. 2, the first body 100 includes a first key button part 110 on a front lower portion of the first body 100. Preferably, the first key button part 110 is a character key button part. The first body 100 further includes a second key button part 120 located on a front upper portion of the first body 100. Preferably, the second key button part 120 is a function key button part and disposed above the first key button part 110.

Referring to FIG. 3, the second key button part 120 comprises a multi-function key button on a central part thereof. Preferably, the multi-function key button is a rotation input device, such as a jog key button 122. The jog key button 122 can be pivoted upward and downward. When the jog key button 122 is pivoted upward, an indicator indicates any one of a direct mode, a character message mode, an alarm/morning call mode and an MP3/BGM mode displayed on the display 210. The indicator serves to inform a mode selected when a selection button is pushed. When the jog key button 122 is pivoted downward, the indicator indicates a wireless Internet mode. Meanwhile, when the jog key button 122 is pushed, a mode indicated by the indicator is selected. The jog key button 122 may also function as a selection button. In other embodiments, the multi-function key button may be a common dome key button.

Referring to FIG. 4, the first body 100 includes a camera 160 and a rear key button part 170 located on a rear surface of the first body 100. As shown in FIGS. 5-7, when observing the mobile terminal 1 from the rear, the camera 160 is disposed on an upper left portion of the rear surface of the first body 100, and the rear key button part 170 is disposed on an upper right portion of the rear surface of the first body 100.

Referring to FIGS. 2 and 3, the first body 100 includes a sliding cover 300. Preferably, the sliding cover 300 is slidably connected to the first body 100 in an up-and-down direction of the first body 100. As shown in FIG. 4, the sliding cover 300 utilizes slide rails 310 on the left and right sides thereof to slidably move with respect to the first body 100. Preferably, the first body 100 comprises rail grooves for slidably guiding the slide rails 310. In one embodiment, the slide rails 310 are disposed on an inner portion of the left and right sides of the sliding cover 300, and the rail grooves for guiding the slide rails 310 are formed on the left and right sides of the first body 100. In another embodiment, the rail grooves may be formed on the sliding cover 200 and the slide rails formed on the first body 100.

In accordance with the present invention, a front-surface structure of the sliding cover 300 is described with reference to FIGS. 2 and 3. Hereinafter, a closed sliding cover indicates that the sliding cover 300 is disposed at an uppermost position in a slidable region. An opened sliding cover indicates that the sliding cover 300 is disposed at a lowermost position in the slidable region. Preferably, a front surface of the sliding cover 300 comprises a U-shaped front-opening groove on an upper portion thereof. Accordingly, when the sliding cover 300 is closed, the sliding cover 300 covers the first key button part 110 but leaves the second key button part 120 uncovered. Moreover, when the sliding cover 300 is opened, the sliding cover uncovers the first key button part 110 in addition to the already-uncovered second key button part 120. Therefore, when the sliding cover 300 is closed, a bottom of the U-shaped front-opening groove is disposed between the first key button part 110 and second key button part 120. However, when the sliding cover 300 is opened, the bottom of the U-shaped front-opening groove is disposed below the first key button part 110.

In accordance with the present invention, a rear-surface structure of the sliding cover 300 is described with reference to FIGS. 5 and 7. Preferably, when the sliding cover 300 is closed, a rear surface of the sliding cover 300 covers the camera 160 but leaves the rear key button part 170 uncovered. Moreover, when the sliding cover 300 is opened, the rear surface of the sliding cover 300 uncovers the camera 160 in addition to the already-uncovered rear key button part 170. Therefore, when the sliding cover 300 is closed, an upper portion of the rear surface of the sliding cover 300 is disposed above the camera 160 and the rear key button part 170. However, when the sliding cover 300 is opened, the upper portion of the rear surface of the sliding cover 300 is disposed below the camera 160 and the rear key button part 170.

The sliding cover 300 comprises a rear surface opening 320. Preferably, the rear surface opening 320 is sized and positioned on the rear surface of the sliding cover 300 such that the rear key button part 170 is externally exposed when the sliding cover 300 is closed. In an alternative embodiment, the rear surface opening 320 may comprise a U-shaped rear opening groove.

Referring to FIG. 7, the second body 200 is capable of rotating 180° with respect to the first body 100. Hence, the second body 200 may be rotated such that the display 210 is at the rear of the mobile terminal 1. In this configuration, the controller 18 can perform a video telecommunication (VT) function because the camera 160 and the display 210 are now disposed on the same rear surface of the mobile terminal 1. In order to perform the VT function, the camera 160 is externally exposed by opening the sliding cover 300 when the second body 200 is rotated 180° to the rear of the mobile terminal 1. Preferably, the controller 18 controls the camera 160 by manipulating the rear key button part 170.

Preferably, the mobile terminal 1 comprises a rotation sensor for recognizing the rotation of the second body 200. The rotation sensor may comprise a magnet disposed in a first body 100 upper portion or a second body 200 lower portion, and a magnet-sensing sensor disposed in the body portion not having the magnet. Preferably, a rotation sensing signal generated by the rotation sensor upon sensing rotation of the second body 200 is transferred to the controller 18.

Furthermore, the mobile terminal 1 comprises an opening sensor for recognizing whether the sliding cover 300 is opened or not. Referring to FIGS. 2 and 4, the sliding rail 310 is formed between the upper portion of the first body 100, the sliding cover 300, and the bottom of the U-shaped front-opening groove. The opening sensor may be a signal terminal generating an electrical signal when contacting the slide rail 310, or when pressed by the slide rail 310, as the slide rail 310 is opened. Preferably, an opening sensing signal generated by the opening sensor is transferred to the controller 18.

Referring to FIG. 6, the controller 18 can display one or more music icons on the display 210 when the mobile terminal 1 is in a state where the second body 200 is rotated to the rear of the mobile terminal 1 and the sliding cover 300 is closed. The music icons include an MP3 storage icon, an online music icon, a contents storage icon and a recording icon, for example. An "MP3 storage" mode may be a menu in which standard MP3 files transmitted through a personal computer (PC) and Advanced Audio Coding files downloaded through the Internet are stored and enjoyed. An "online music" mode may be a menu in which recently updated music is searched easily. Moreover, actions such as advanced listening, direct listening, and the download and setting of music files, bell sounds and ring-back tones are performed in the "online music" mode. A "contents storage" mode may be a menu in which bell sounds and ring-back tones downloaded from the Internet are identified, reproduced and set. A "recording" mode may be a menu in which an audio sound, such as a voice, is recorded for storage in the mobile terminal 1. Preferably, the controller 18 enables the mobile terminal 1 to enter into a music mode indicated by any one of the music icons by manipulating the rear key button 170.

Referring to FIG. 2, the controller 18 enables the camera 160 to perform a shooting function to capture moving pictures or still images when the sliding cover 300 is opened from an initial state. Here, the initial state refers to when the front surfaces of the first body 100 and the second body 200 face toward the same direction, and the sliding cover 300 is closed. The controller 18 further enables the camera 160 to enter into a preview mode when the sliding cover 300 is opened from the initial state. In the preview mode, images viewed through the camera 160 are preferably displayed on the display 210 prior to being captured. Preferably, the controller 18 controls the camera 160 by manipulating the first key button part 110 or the second key button 120.

Hereinafter, an operation of the mobile terminal in accordance with one embodiment of the present invention will be described. Referring to FIG. 2, to maintain a stable coupling between the first body 100 and the sliding cover 300 when the sliding cover 300 is opened, a minimum coupling length is preferable between the slide rail and the rail groove. Accordingly, it is preferable to minimize a length from a lower portion of the first body 100 to an upper portion of the second body 200, and to maximize a height of the display 210, by arranging an upper end of the second key button part 120 to be at the same level as an upper end of the first body 100 given that other conditions remain the same.

Thus, when the upper end of the second key button part 120 is projected over the upper end of the first body 100, the second body 200 has a reverse U-shaped groove formed on a lower portion thereof to which the projected part of the second key button part 120 is leaded to rotate. Therefore, if the reverse U-shaped groove is formed, the height of the display 210 is reduced. Further, because a minimum coupling length should be established, a marginal length corresponding to the projected height of the second key button part 120 between the lower end of the first key button part 110 and the lower end of the first body 100 is preferably formed so that it is not possible to reduce the height of the first body 100.

Furthermore, if a rectangular opening instead of the U-shaped opening groove is formed on the sliding cover 300, the upper end of the second key button 120 is preferably not placed at the same level as the upper end of the first body 100. Accordingly, the height of the first body 100 is elongated.

Referring to FIG. 2, the preview mode using the camera 160 is entered into when the sliding cover 300 is opened from the initial state. Thereafter, the display 210 may display images to be captured by manipulating at least one of the first key button part 110 and the second key button part 120. Hence, the preview mode is easily entered into by sliding the sliding cover 300 downward from the initial state.

Referring to FIG. 3, because the second key button part 120 is externally exposed when the mobile terminal 1 is in the initial state, the mobile terminal 1 may be manipulated in the initial state using the second key button 120, which is a function key button part. Preferably, the mobile terminal 1 is easily manipulated by pivoting the jog key button 122 upward and downward, or by pushing the jog key button 122 inward. Furthermore, because the first key button part 110 is protectively covered by the sliding cover 300 in the initial state, the first key button part 110 cannot be unintentionally manipulated. Referring to FIG. 5, the camera 160 is also covered by the sliding cover 300 in the initial state. Therefore, a camera lens is protected from external harm.

Referring to FIG. 6, a music mode, represented by one more music icons displayed on the display 210, can be easily entered into by manipulating the rear key button 170. Preferably, the music mode can be entered into after rotating the second body 200 180° when the sliding cover 300 is closed.

Referring to FIG. 7, a video telecommunication (VT) function can be easily entered into by manipulating the rear key button part 170. Preferably, the VT function can be entered into when the sliding cover 300 is opened and the second body 200 is rotated 180°. Here, because both the rear key button part 170 and the display 210 face the user, the user can easily utilize the display 210 while manipulating the rear key button part 170.

In accordance with another embodiment of the present invention, the second body 200 comprises a second camera disposed at a front surface thereof. Accordingly, the controller 18 is adapted to perform the VT function using the second camera disposed on the front surface of the second body 200 when the mobile terminal 1 is in the initial state. That is, when the sliding cover 300 is closed, and the display 210 and the camera 160 are disposed opposite of each other, the VT function can still be performed using the second camera located on the front surface of the second body 200.

In accordance with another embodiment of the present invention, the rear opening 320 does not exist to externally expose the rear key button 170 when the sliding cover 300 is in a closed state. Accordingly, the second key button part 120 performs the same functions as that of the rear key button part 170 when the sliding cover 300 is closed. For example, when the second body 200 is rotated and the sliding cover 300 is closed, music may be controlled using the second key button part 120 instead of the rear key button part 170.

Figure 9:
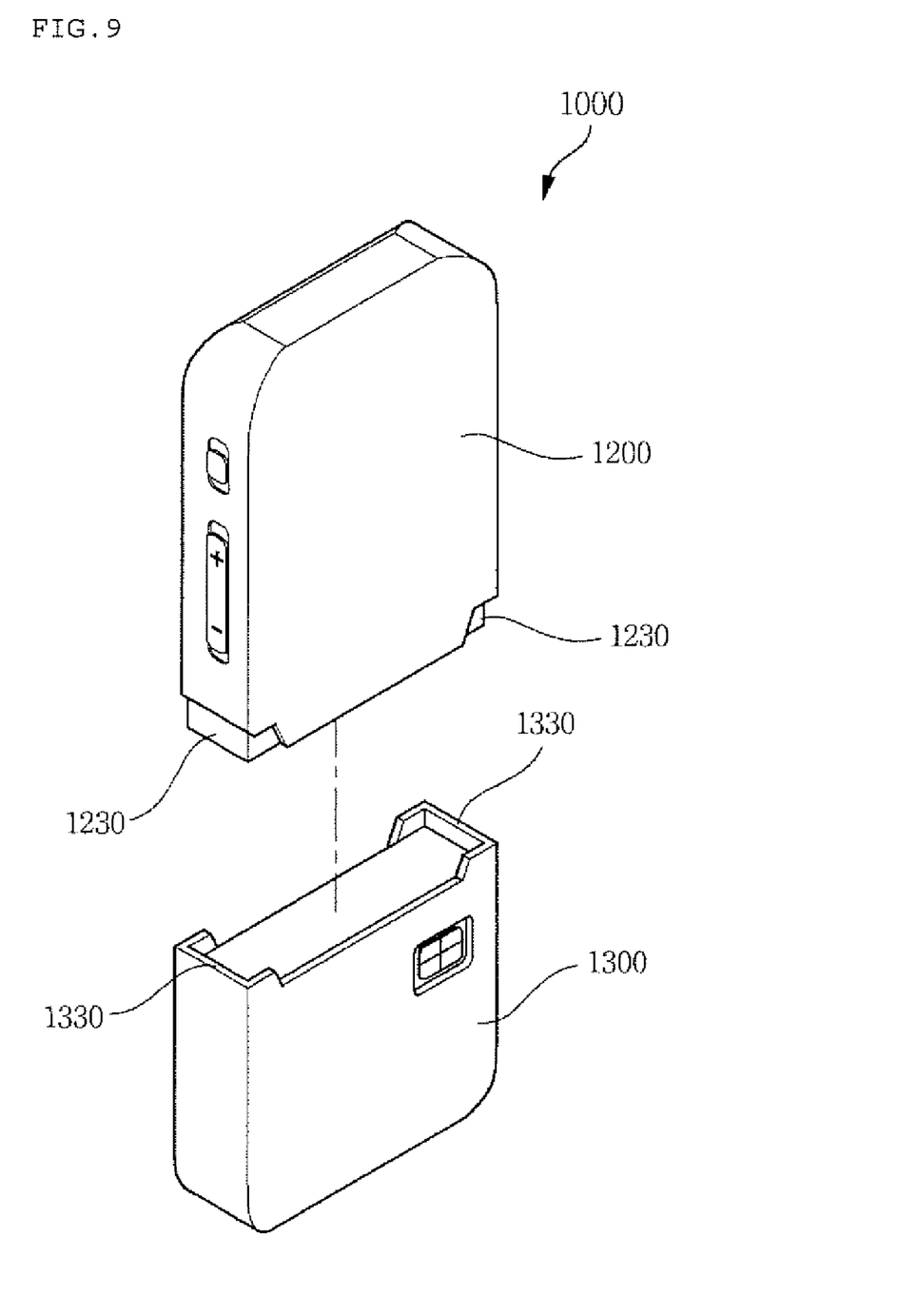
FIG. 9 is a perspective view illustrating a mobile terminal in accordance with another embodiment of the present invention.

FIG. 9 is a perspective view illustrating a mobile terminal in accordance with another embodiment of the present invention. Referring to FIG. 9, a mobile terminal 1000 comprises a rotation blocking unit to block rotation of a second body 1200 when a sliding cover 1300 is closed.

Referring to FIG. 9, the rotation blocking unit is preferably a U-shaped protrusion 1330 projected from left and right portions of an upper end of the sliding cover 1300. Preferably, a thickness between a front surface and a rear surface of the second body 1200 is the same as a thickness of the sliding cover 1300. Accordingly, the second body 1200 comprises a cut-out surface 1230 corresponding to a depth and shape of the U-shaped protrusion 1330 of the sliding cover 1300. Preferably, the depth and shape of the cut-out surface 1230 at the left and right sides of a lower portion of the second body 1230 inserts into the U-shaped protrusion 1330. Furthermore, each of the U-shaped protrusion 1330 and the cut-out surface 1230 are formed complementary to each other so that they can be coupled together even when the second body 1200 is rotated 180° and the sliding cover 1300 is opened.

In accordance with one embodiment of the present invention, a mobile terminal includes a body, a display, a first key button part, a second key button part, a camera and a sliding cover. The display is disposed on an upper portion of a front surface of the body. The first key button part is located on the front surface of the body under the display, and the second key button part is located on the front surface of the body between the display and the first key button part. The first key button part includes function key buttons. The camera is disposed on a rear surface of the body. The sliding cover is slidably connected to the body, wherein the sliding cover is slid open to externally expose the first key button part and slid closed to cover the first key button part and the camera. In accordance with this embodiment of the present invention, the mobile terminal has a uni-body construction. Therefore, the portion of the body wherein the display is disposed is not rotatable.

According to the described embodiments, a length of the mobile terminal from a lower end of the first body to an upper end of the second body is minimized. Moreover, a height of the display is maximized by arranging an upper end of the second key button to be at the same level as an upper end of the first body, given that other conditions remain the same.

According to the described embodiments, because the mobile terminal enters a preview mode using the camera disposed on the rear surface of the first body when the sliding cover is opened from the initial state, the preview mode can be easily entered into by sliding the sliding cover downward in the initial state.

According to the described embodiments, because the second key button is externally exposed in the initial state, the mobile terminal can be manipulated using the second key button, which is a function key, while in the initial state.

Furthermore, according to the described embodiments, because the first key button is protectively covered by the sliding cover in the initial state, the unintentional manipulation of the first key button is prevented. Moreover, according to the described embodiments, because the camera is covered by the sliding cover in the initial state, the camera lens is protected from external harm.

Furthermore, according to the described embodiments, when the second body is rotated 180° and the sliding cover is closed, a music mode indicated by a music icon displayed on the display, may easily be entered into by manipulating the rear key button.

Furthermore, according to the described embodiments, when the sliding cover is opened and the second body is rotated 180°, or the second body is rotated 180° and the sliding cover is opened in the initial state, a video telecommunication (VT) function can easily be performed by manipulating the rear key button.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile terminal comprising:
    a first body;
    a first front key button part disposed on a front surface of the first body;
    a rear key button part disposed on a rear surface of the first body;
    a second body rotatably connected to the first body, wherein the second body is rotatable about a longitudinal axis of the first body;
    a display disposed on a front surface of the second body;
    a camera disposed on the rear surface of the first body;
    a sliding cover slidably connected to the first body; and
    a controller configured for:
        controlling the camera to capture an image based on input received via the rear key button part while the display is rotated to face the same direction as the camera;
        controlling the display to display the captured image, and
        transmitting the captured image,
    wherein the rear key button part is exposed both when the sliding cover is in a closed state and when the sliding cover is in an opened state.

2. The mobile terminal of claim 1, wherein the sliding cover is configured for covering the first front key button part and the camera when the sliding cover is in the closed state, and for exposing the first front key button part and the camera when the sliding cover is in the opened state.

3. The mobile terminal of claim 2, wherein the sliding cover comprises a rear surface opening configured for exposing the rear key button part when the sliding cover is in the closed state.

4. The mobile terminal of claim 2, wherein the controller is further configured for controlling a music output based on the input received via the rear key button part when the display is rotated toward the rear of the mobile terminal and the sliding cover is in the closed state.

5. The mobile terminal of claim 4, wherein the controller is further configured for controlling the display to display one or more music icons when the display is rotated toward the rear of the mobile terminal and the sliding cover is in the closed state.

6. The mobile terminal of claim 1, further comprising:
    a second front key button part disposed on the front surface of the first body,
    wherein the sliding cover is configured for exposing the second front key button part when the sliding cover is in the closed state, and
    wherein the sliding cover is configured for exposing the second front key button part when the sliding cover is in the opened state.

7. The mobile terminal of claim 6, wherein the second front key button part is disposed on an upper front surface of the first body above the first front key button part.

8. The mobile terminal of claim 7, wherein the sliding cover comprises a front surface opening configured for exposing the second front key button part when the sliding cover is in the closed state.

9. The mobile terminal of claim 6, wherein the second front key button part comprises a multi-function key button.

10. The mobile terminal of claim 9, wherein the multi-function key button is a rotatable input device.

11. The mobile terminal of claim 1, further comprising:
    a camera disposed on the front surface of the second body,
    wherein the controller is further configured for performing a video telecommunication function using the display and the camera disposed on the front surface of the second body.

12. The mobile terminal of claim 1, further comprising a rotation blocking unit configured for blocking rotation of the second body when the sliding cover is in the closed state.

13. The mobile terminal of claim 12, wherein:
    the rotation blocking unit comprises one or more protrusions extended from an upper end of the sliding cover; and
    wherein the one or more protrusions are configured for engaging with a lower end of the second body.

14. The mobile terminal of claim 13, wherein the controller is further configured for activating a mode to perform a function corresponding to a rotation of the second body or a movement of the sliding cover to the opened state.

15. A mobile terminal comprising:
    a first body;
    a rear key button part disposed on a rear surface of the first body;
    a second body rotatably connected to the first body, wherein the second body is rotatable about a longitudinal axis of the first body;
    a sliding cover slidably connected to the first body and configured for covering and uncovering a front surface and the rear surface of the first body;
    a display disposed on a front surface of the second body;
    a camera disposed on the rear surface of the first body; and
    a controller configured for;
        activating a mode to perform a function corresponding to a rotation of the second body or a movement of the sliding cover to uncover the front surface and the rear surface of the first body;
        controlling the camera to capture an image based on input received via the rear key button part while the mode is activated and the display is rotated to face the same direction as the camera;

controlling the display to display the captured image while the mode is activated; and transmitting the captured image while the mode is activated.

16. The mobile terminal of claim 15, further comprising:

a front key button part disposed on a front surface of the first body, wherein the sliding cover is further configured for covering the front key button part and the camera when the sliding cover is in a closed state, and for exposing the front key button part and the camera when the sliding cover is in an opened state.

17. A mobile terminal comprising:

a body;

a display disposed on an upper portion of a front surface of the body;

a first front key button part disposed on the front surface of the body under the display;

a second front key button part disposed on the front surface of the body between the display and the first front key button part;

a rear key button part disposed on a rear surface of the body;

a camera disposed on the rear surface of the body;

a sliding cover slidably connected to the body; and a controller configured for:

controlling the camera to capture an image based on input received via the rear key button part;

controlling the display to display the captured image, and transmitting the captured image, wherein the sliding cover is configured for covering the first front key button part and the camera when the sliding cover is in a closed state, and for exposing the first front key button part and the camera when the sliding cover is in an opened state.

* * * * *